United States Patent [19]

Lagasse et al.

[11] 4,014,217

[45] Mar. 29, 1977

[54] TACTILE PICK-UP

[75] Inventors: Jean Lagasse, Toulouse; Jean Clot, Saint-Orens de Gameville; Jean Falipou, Escalquens; Andre Loubieres, Ramonville Saint-Agne; Pierre Rabischong, Montpellier; Jean-Pierre Richard, Ramonville Saint-Agne; Ai Bui, Toulouse, all of France

[73] Assignee: Agence Nationale de Valorisation de la Recherche Etablissement Public de Droit, Neuilly-sur-Seine, France

[22] Filed: Nov. 28, 1975

[21] Appl. No.: 635,956

[52] U.S. Cl. .............................. 73/432 R; 338/5; 338/114

[51] Int. Cl.² ...................................... H01C 10/10

[58] Field of Search .......... 73/172, 398 AN, 432 R; 338/99, 100, 114, 5

[56] References Cited

UNITED STATES PATENTS

| | | | |
|---|---|---|---|
| 3,125,739 | 3/1964 | Deibel et al. | 338/99 |
| 3,503,031 | 3/1970 | Nyhus | 338/99 |
| 3,806,471 | 4/1974 | Mitchell | 338/99 X |
| 3,818,756 | 6/1974 | Barron et al. | 73/172 |
| 3,836,900 | 9/1974 | Mansfield | 338/99 X |

FOREIGN PATENTS OR APPLICATIONS

| | | | |
|---|---|---|---|
| 394 | 11/1971 | Japan | 73/172 |

*Primary Examiner*—James J. Gill
*Attorney, Agent, or Firm*—Shlesinger, Arkwright, Garvey & Dinsmore

[57] ABSTRACT

The invention relates to a tactile pick-up for making contact with an object and emitting signals which are representative of the deformation caused by the object. The pick-up comprises a supple layer of variable electrical conductivity as a function of its state of compression, a matrix of measuring electrodes each connected to an output lead, and a large number of conducting elements connected to an electric source fixing their potential at a determined excitation value.

10 Claims, 13 Drawing Figures

TACTILE PICK-UP

The invention concerns a tactile pick-up used to make contact with an object in order to release signals which are connected with the deformation caused by this object.

This pick-up consists of a supple layer 1 of variable electric conductivity as a function of its state of compression, a matrix of measuring electrodes 4, each connected to an output lead 6, and a large number of conducting elements 2 connected to and electric source 7 fixing their potential at a determined excitation value.

The pick-up according to the invention permits at the time of the contact, the recognition of an object and its surface condition, as well as the detection of the applied pressures or its sliding effect.

The invention concerns a tactile pick-up used to come in contact with any type of object or body in order to release information in regard to the static or dynamic deformation caused by this object or body on the pick-up; in particular, this pick-up will make it possible to recognize the shape of an object and its surface condition, and to insure the detection of pressure applied to it or the sliding effect or the start of a sliding which may occur when coming contact with this object.

In the technical field of identification, at the present time, no pick-up capable of covering large surfaces and which is able to furnish, in an instant, information on the distribution of the pressures applied to it is known. There are pick-ups in existence which are capable of measuring a pinpoint stress or a pressure limited to an area of small dimensions, but the finished information is unsuited for making it possible to reveal the characteristics of the shape or the surface condition of an actual object. In order to mitigate this inconvenience, several pick-ups of this type may be connected; however, the system obtained has a very complicated structure, while its resolution ability remains very inadequate.

It is an objective of the invention to furnish a tactile pick-up of simple structure, capable of covering an extensive surface and profiting from a resolution ability which can be increased.

It is another objective of the invention to furnish a pick-up of high sensitivity capable of detecting pressures of low force.

It is another objective of the invention to furnish a pick-up that provides an image of the impression of an object put in contact with it.

It is another objective of the invention to furnish a pick-up capable of detecting any variation in the distribution of pressures applied to it; in particular, it is an objective of the invention to make it possible to detect the start of a sliding between the pick-up and the object.

It is another object of the invention to furnish a pick-up capable of measuring variations of pressure applied to it, especially with a view of determining the surface condition toward an object.

It is another objective of the invention to make it possible to visualize on a screen the distribution of pressures applied to the pick-up.

For this purpose, the tactile pick-up comprises a thin supple layer with a variable electric conductivity as a function of its state of compression; a matrix of electrodes containing a large number of conducting electrodes, so-called measuring electrodes, distributed over a side of this supple layer; electrical supply devices, arranged to generate in this supple layer a distribution of weak-power currents being repeated in a practically identical manner straight above or below each measuring electrode when the supple layer is at rest. These electrical supply devices contain an electrode source and conducting elements distributed on the same side of the supple layer as the measuring electrodes so as to imbricate with these without electrical contact; a group of output leads, each connected to a measuring electrode to emit an electrical image signal of the electrical state of and above-mentioned electrode; the processing devices connected to the group of output leads and adapted in order to transform the group of released signals into a group of usuable magnitudes.

When the supple layer is in a state of rest, i.e. not compressed, a stable distribution of current lines is established in it. A pressure applied to the surface of the pick-up causes a deformation of its supple layer which is accompanied by perturbations in the distribution of the current lines and variations of the electrical state of the measuring electrodes located at the level of the compressed zones; for each electrode, these variations are a function of the state of compression of the part of the layer located straight above or below it, and they produce a group of signals in these output or outlet leads which are the image of the distribution of pressures on the pick-up. The density of the measuring electrodes defines the resolution of the system whereas the surface covered by them defines the field the pick-up can cover. The present state of electronic technology makes it possible to benefit at the same time from a very good resolution and an increased field, giving the pick-up the capability to precisely recognize the shape and the surface condition of an object of considerable size.

According to a preferred manner of construction, the conducting elements are connected to the electrical source with a view of fixing their potential at an excitation value determined with regard to the reference potential; therefore, these conducting elements have the double function of insuring the supply of electricity and playing the role of "protective rings" with respect to the measuring electodes. They cause the creation of low-power current lines in the supple layer and make it possible to localize the effect of the modifications of the above-mentioned current lines to only the zones affected by the compressions so that only the electrodes located in those zones undergo modifications in their electrical state.

In the pick-up of this type, one of the sides of the supple layer is empty which gives it several advantages: simplicity of manufacture and the possibility to benefit from increased sensitivity by providing a very deformable layer.

According to another type of construction, the conducting elements are connected to the reference potential of the electrical source in order to only play the role of protective rings in respect to the measuring electrodes. In this case, the pick-up, on the other side of the supple layer, contains a supple surface electrode connected to the electric source in order to fix its potential at an excitation value determined with regard to the reference potential. This surface electrode, consisting, for example, of a small metal deposit, insures the supply of the pick-up.

The supple layer, the resistivity of which is a function of the state of compression, may be of various natures. This layer may, for example, be made of an alveolar material, of the expanded foam type, charged by means of a powder of a conducting material, active carbon, metal powder, etc. Such alveolar material is very sensitive to the slightest pressure that is applied, and the pick-up is capable of revealing a contact being applied to it even with a negligible effort. In particular, a pick-up of this type can be used in order to indicate the presence or the absence of a contact straight above or below each measuring electrode.

The supple layer may also be made of a compact elastic material of the elastomer type with a silicon base and charged by means of a powder of a conducting material. This material is less sensitive than the former and undergoes a slight deformation in regard to slight pressures and a larger one in regard to more intense pressure. The distribution of the currents traversing the measuring electrodes therefore supplies an image of the impression which the object makes in the elastic layer of the pick-up.

It must be noted that the two above-mentioned types of pick-ups can be connected in order to create a pick-up capable, at the same time, to detect a contact starting from its appearance and to then furnish the dimension of the applied pressures. For this purpose, the most sensitive pick-up is arranged on the outside so that the action is first applied to it, while the other pick-up placed side by side below the first one is influenced only when the first one has undergone a minimum flattening. In this case, the matrix of measuring electrodes and the conducting elements of the first pick-up are chosen in order to supply a suppleness which is as great as possible. They consist, for example, of a supple printed circuit, especially a double-face circuit, the technology of which is, at the present time, perfectly suitable.

In addition, the processing devices of the pick-up can be adapted, either in order to work out the dimensions of the applied absolute pressures (value of the mean pressure straight above or below of each measuring electrode), or in order to detect pressure variations, or in order to carry out both types of processing.

In the first case, the processing devices consist, for example of an adaptation circuit to the determined time constant arranged in order to integrate the signals coming from the output or outlet leads and to furnish analog signals, called static signals, of values proportional to the means values of the pressures applied to the pick-up. The time constant which conditions the duration of the period on which the averages are worked out is chosen so as to eliminate short accidental variations of pressure which may occur.

In the second case, the processing devices consist, for example of an amplification and detection circuit arranged to detect the variations of the signals coming from the output or outlet leads and to furnish signals, called dynamic signals of values proportional to the amplitude of the pressure variations. In particular, a pick-up of this type is able to reveal the state of roughness of the surface of an object; it suffices to cause a rapid movement and a weak amplitude of the object in proportion to the pick-up (or of the pick-up in proportion to the object). The deformations of the supple layer caused by such a movement present in effect variations all the more accentuated when the surface of the object is rougher. The amplitude of the dynamic signals, connected with these variations, therefore makes it possible to determine the surface condition of the object. In addition, such a pick-up especially when it is provided with a relatively sensitive supple layer, is capable of revealing any start of sliding between the object and the pick-up. In fact, in the phase which preceeds a sliding, the deformation undergone by the supple layer is modified and undergoes a slight tangential displacement which causes the creation of a dynamic signal. It must be noted that this modification appears before there even was, properly so called, sliding, i.e., before the point where the object moves in a tangential direction, the point of the pick-up with which it is in contact. Thus, the pick-up makes it possible to reveal not only a start of sliding, but even the imminence of such a movement, and this the more so when the supple layer is more malleable.

Of course, the processing devices of the pick-up may contain a combination of the above-mentioned circuits arranged parallelly; in particular, the static and dynamic signals emitted by these circuits are injected into a summation circuit which combines them according to their intended application with a view of their scanning.

It must be noted that, whatever may be the case, the signals released by the outlet or output leads may be received simultaneously or, on the contrary, sequentially by connecting the output or outlet leads to an electronic switch adapted to scan successively each of them in an order which is a function of the addresses of the corresponding measuring electrodes.

The following description which refers to the attached drawings presents, by means of extensive drawings, the construction methods of the invention; on the drawings:

In a section and using a very enlarged scale,

FIG. 6 is an example of the electronic processing unit, serving the operation of the pick-up, whereas.

Figure 1:
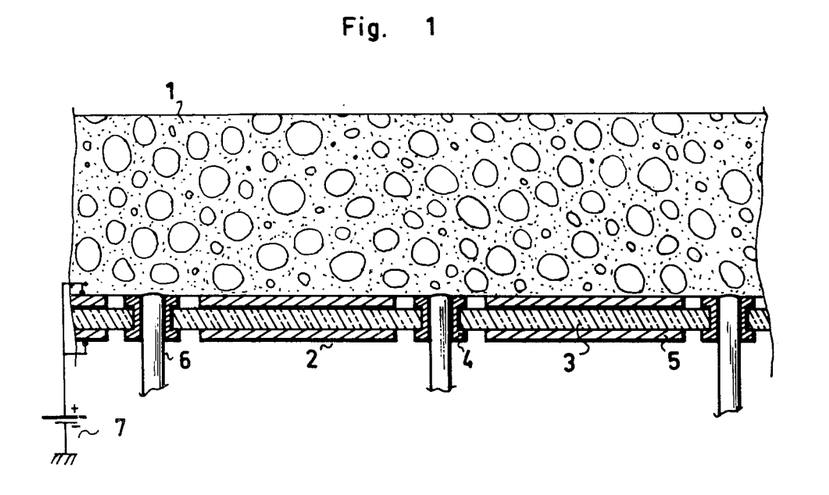
FIG. 1 shows an example of the pick-up according to this invention.

The pick-up shown in the diagram using a very enlarged scale in FIG. 1 consists of a thin layer 1 of a thickness of several millimeters, made of an expanded alveolar foam, more particularly, silastene foam; before the expansion, this foam is charged by means of a fine powder mixture of active carbon and fine metal powder. This layer 1 has the advantage of high elastic deformation capability and its resistivity is a function of its state of compression.

On one side of the layer 1, a supply printed double-face circuit 2 is fastened, consisting of a supple dielectric support 3, a matrix of measuring electrodes 4 surrounded by the conducting elements 5.

In the example, as this is known in the case of printed double-face circuits, each electrode is formed by circular metal pellets, of small diameter, arranged on each support surface 3 and, in its center section by a metallized opening into which an output or outlet lead 6 is welded.

The conducting elements 5 consist of small metal covers lining the two sides of the support 3 and interrupted near the measuring electrodes 4 so that they are electrically insulated from them.

Figure 2:
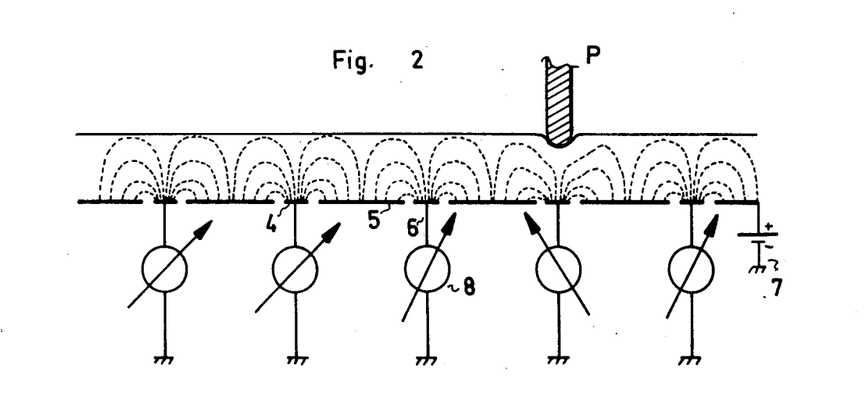
FIG. 2 is a symbolic diagram used to facilitate the understanding of the operation of this pick-up.

An electrical source 7 puts the conducting elements 5 at an electrical excitation potential of constant value. This therefore establishes in the conducting layer 1 a distribution of currents such as they are shown in FIG. 2, the power of which can be extremely low (several milliwatts for a unit containing 600 electrodes). A current measuring device, such as 8 on the output or outlet lead of each electrode, makes it possible to measure the intensity which goes through this electrode; the distribution of the current lines is directly connected to the state of compression of the supple layer and through the appropriate gauging, the measurement of the intensities which every moment go through the electrodes, furnishes a measurement of the pressures P to which at every moment this supple layer 1 is subjected.

In the case of a pick-up of this type, one side of the supple layer 1 is free and the pressures are applied directly to the supple layer 1, so that the pick-up can be extremely sensitive. We would like to note that nothing keeps the layer 1 from being fixed in a detachable way on the circuit 2 in order to make it interchangeable.

Figure 3:
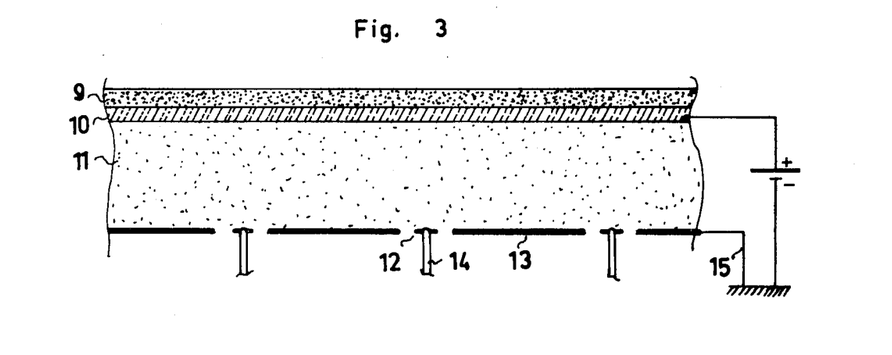
FIG. 3 is a diagram, a section using an enlarged scale, of another example of the pick-up.

FIG. 3 is a diagram of another example of the pick-up essentially consisting of a thin soft protective layer 9 which is also insulating and is specifically made of elastomer, and of a thin and supple metal layer 10, of a layer 11 made of elastomer with a silicone base charged by means of a fine powder mixture of active carbon and fine metal powder, finally fixed on this elastic layer, of a large number of measuring electrodes 12 which are surrounded by the conducting elements 13 playing the role of protective rings; as above, each electrode 12 is of circular shape and contains a center opening into which an output or outlet lead 14 is welded.

An electrical source shown in the diagram as FIG. 15 puts the metal layer 10 at an electrical excitation potential determined in proportion to a constant reference potential to which the conducting elements are brought 13.

In the rest state, the measuring electrodes 12 are all located at an equal distance from the metal layer 10 and are each separated from this metal layer 10 by the electrical resistance which is presented by the section of the layer 11 located straight above or below the electrode in question; for the circular-shaped electrodes, the protective conductors 13 define the very approximately rectilinear current lines, each electrode picking up the current which traverses a section of approximately cylindrical shape. In the rest state, the resistances located straight above or below the electrodes are equal and the mentioned electrodes are in identical electrical states.

When a pressure is applied to the surface of the pick-up, the elastic layer 11 is compressed in the corresponding zone and the resistance of the locally involved section or sections varies and causes a variation of current which the electrode or electrodes located straight above or below the compressed zone pick up. These current variations are proportional to the deformation and the group of currents traversing the electrodes supply an image of the deformation of the elastic layer 11 and, therefore, of the impression created by the pressures applied to the pick-up.

Figure 4:
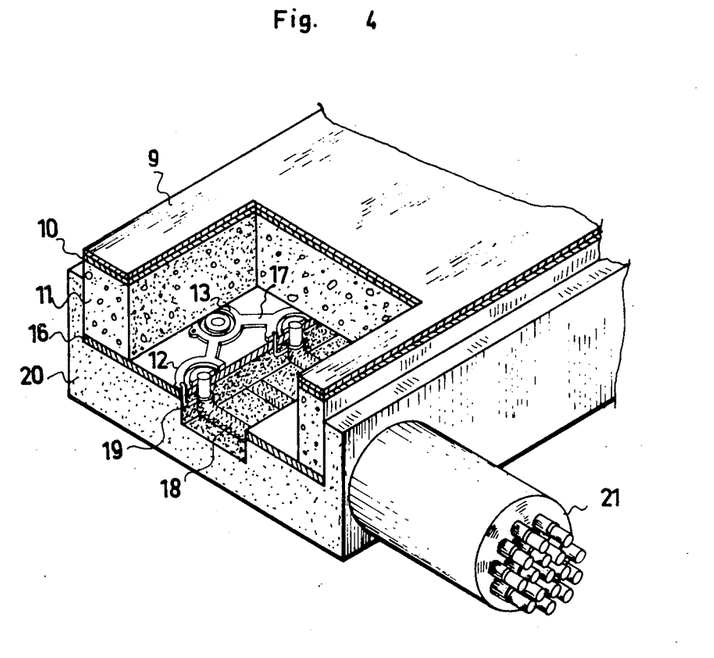
FIGS. 4 and 5 are perspective views, partially cut away and using an enlarged scale, of the two other types of construction.

FIG. 4 shows a special construction method of pick-up of the type described above; the reference having a relation to the same elements have been used again in this figure; one finds again the protective layer 9, the thin metal layer 10, the charged elastic layer 11, the electrodes formed by conducting pellets 12 arranged together with the conducting elements in the form of rings 13 on a supple support 16, which is fastened on the surface of the elastic layer 11; the protective rings 13 are connected with each other by printed wires 17.

In this example, each output or outlet lead consists of a concentric cable 18 containing, in the classical manner, on the one hand, a central conducting core connected to the corresponding measuring electrode, and on the other hand, a conducting case or tube separated from the central core and electrically connected by a conductor 19 to the protective ring of that electrode. At its lower section, the pick-up is completed by a supple cover layer 20 at the interior of which the above-mentioned concentric cables are immersed, which converge toward an outlet cable 21 from which they can be connected to the processing devices.

Figure 5:
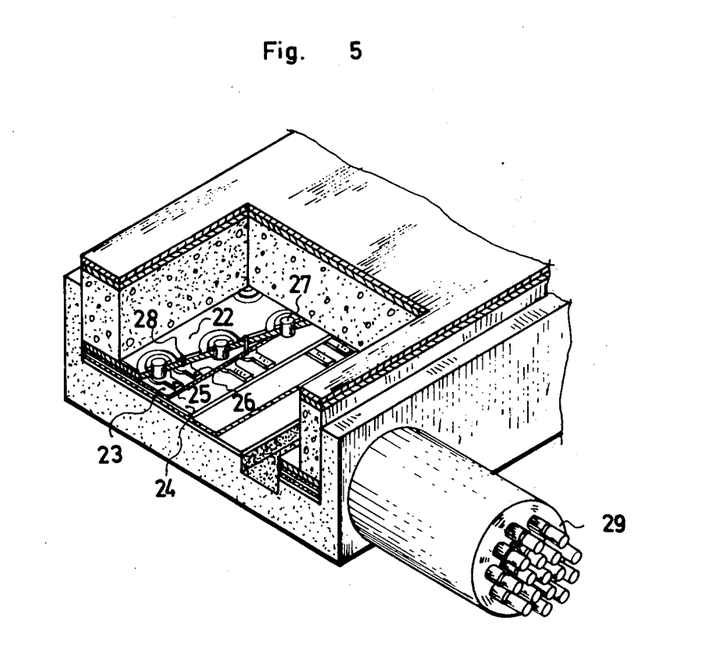

FIG. 5 shows a method of construction in which the protective conducting elements consist of a thin conducting layer 22 surrounding the electrodes and separating them from each other; this layer is perforated by a circular opening at the site of each electrode so as to be separated from it.

In the case of this method of construction, the group of output or outlet leads consists of supple printed circuits such as shown in 23 and 24, superposed and separated from each other. Each circuit contains on one plane a large number of printed conducting wires 25 separated from each other by printed protective wires 26. Each printed lead 25 is connected to a measuring electrode by a short connection lead 27, whereas each protective wire 26 is connected to the protective layer 22 by a short connecting lead 28. On the edges of the pick-up, the printed leads 25 and the protective wires 26 are joined respectively with the central cores and with the cases or tubes of the concentric outlet cables 29.

The construction of such a structure makes use of completely up-to-date technology and makes it possible to set up a highly increased electrode density through a suitable choice of the number of superposed printed circuits.

Figure 6:
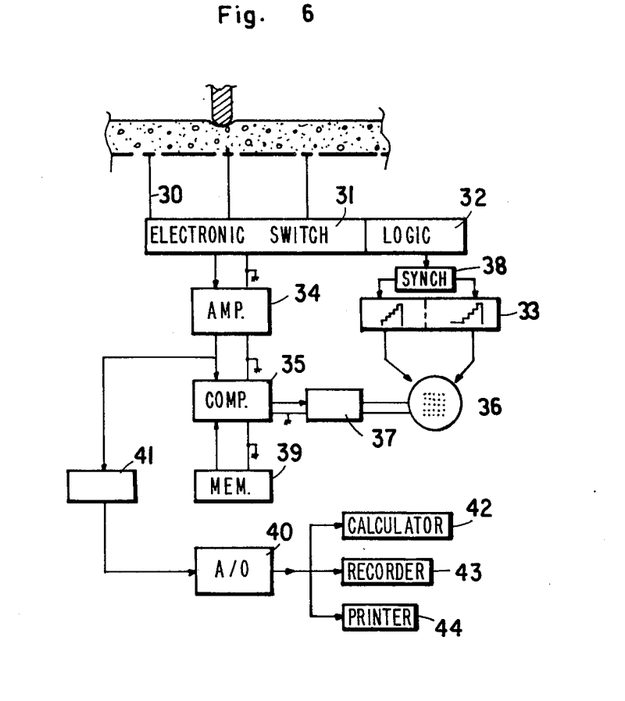

FIG. 6 shows a diagram of an electronic unit capable of equipping the pick-up of the invention.

In this figure, the output or outlet leads of the pick-up are referred to as 30 and feed an electronic switch 31, adapted to detect successively and sequentially, each of the currents coming from measuring electrodes and transmitted by the output or outlet leads; these are scanned or evaluated in an order which is a function of the addresses of the corresponding electrodes. In order to achieve this, the switch 31 contains, in the classical manner, a command logic 32 which releases this sequential scanning and, as will be seen, insures the synchronization of the scanning signals produced by a generator 33. We will not supply any more details in regard to the switch 31 which is of well-known type.

At the outlet, the switch 31 which is connected to an amplifier 34, which is itself connected to an electronic comparator 35, this comparator, which is also of a classical type, is adapted in order to compare the signal which is transmitted to it at each sequence by the switch at a determined threshold put into the memory first. This comparator 35 furnishes a command signal which makes it possible to modulate the Wehnelt of a cathodic tube shown in diagram in 36; in the classic manner, this Wehnelt is fed by the interposition of an adaptation circuit 37.

In addition, scanning signals are applied to the horizontal and vertical deflection plates X, Y in steps which are furnished by the generator 33, which is synchronized with the switch 31 by means of a synchronization system 38 controlled at the command logic of this switch.

Figures 7, 8:
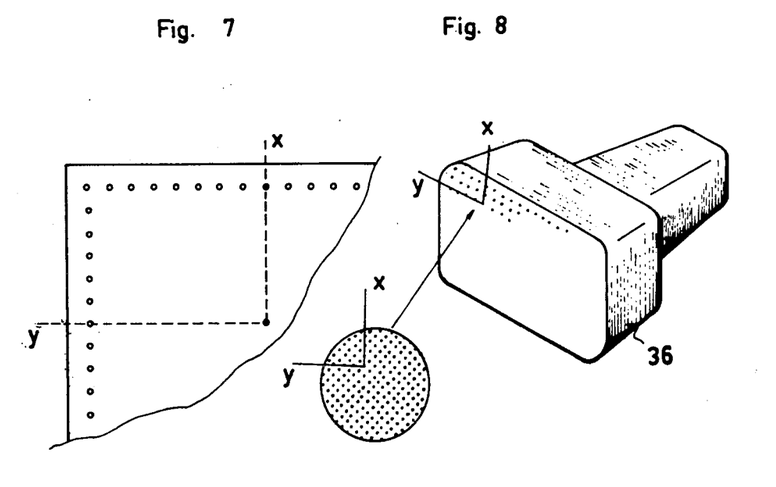
FIGS. 7 and 8 are diagrams to be used to facilitate the understanding of the operation of this unit.

Therefore, as shown in FIGS. 7 and 8, the generator 33 defines on the visualization screen of the cathodic tube 36, a scanning field of which each point of the addresse $x, y$ corresponds to a measuring electrode of the same address $x, y$ on the pick-up; each of these points, an image of the corresponding electrode, is carried sequentially to brightness or to termination in a manner synchronized with the scanning carried out by the switch 31. The luminoisty of the points of the screen is modulated by the comparator 35, and on this screen, there appears the image of the pressure applied on all the electrodes, and therefore of the impression or imprint of the object which performs these pressures. By means of a suitable selection of the luminosity, one obtains in this manner a luminous image of the shape of this object on the visualization screen. We would like to note that the threshold memorized in the comparator 35 may be variable and programmed in an attached memorization circuit 39.

In addition, FIG. 6 shows a numerization circuit, containing an analogue-digital converter 40 arranged parallel to the outlet of the amplifier 34 by the interposition of an adaptation circuit 41. This analogue-digital converter of the classical type furnishes a number of digital signals, the image of the applied pressures, which lend themselves to numerical scanning. This converter can, for example, inject the whole entity of the digital signals into a calculator 42 or into a magnetic recorder 43 or a numerical printer 44.

It is understood that the processing devices to equip the pick-up according to the invention may be of a different type; in practice, they will be adapted to the intended application.

Figure 9:
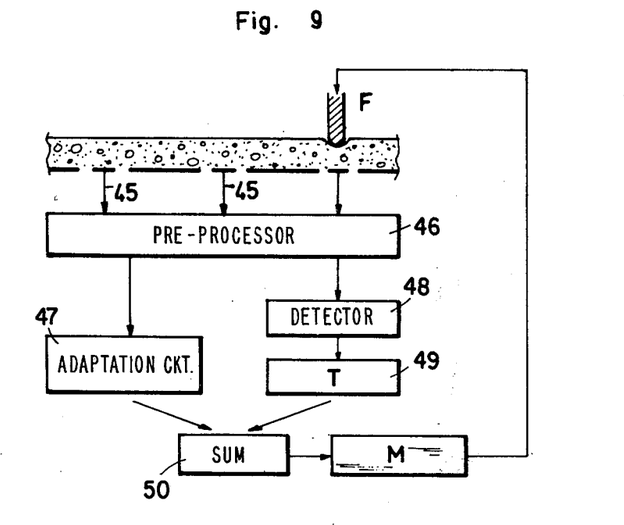
FIG. 9 is a diagram of another processing unit which can be used in the pick-up with a view toward the controlling of a tension system, whereas the FIGS. 10a, 10b, 10c and 10d show the behavior of the signals in different phases of processing.

For example, in FIG. 9, a pick-up is shown which is equipped with processing devices with a view to the control of a tension or pressure system containing at least one pressure element symbolized by an arrow F and an operator M, for example a motor, arranged to operate this element F. In particular, this pressure or tension system may consist of an orthopedic prehension system for which it is expedient to adjust the tension pressure of the objects so as to avoid a sliding when they are lifted.

On this FIG. 9, one finds again the output or outlet leads of the pick-up referred to in 45 which transmit the electric currents traversing the measuring electrodes to a pre-processing unit 46. The latter selects the received informations with the addresses of the corresponding electrodes and, should the occasion arise, makes them undergo a pre-processing (especially linearization of the function of transfer between the intensities of the currents and the applied pressures). In particular, the unit 46 can, as in the preceding example, contain a sequential switch adapted to scan successively each lead in an order connected to their addresses.

The signals coming from the unit 46 are processed in a parallel fashion in two ways, called static and dynamic, the one to measure the mean or average pressures applied, and the other to measure the pressure variations.

The static method contains an adaptation circuit 47 at a determined time constant, arranged in order to integrate each signal and furnish an analogical signal or proportional value to the mean value of the pressure during determined time periods.

Figure 10A:
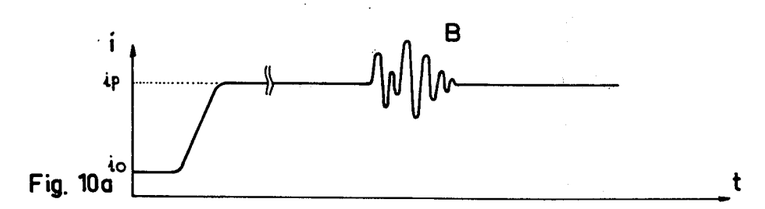
Figure 10B:
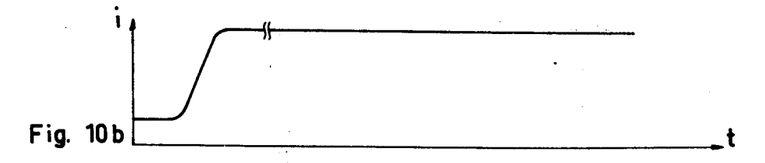

In FIG. 10a, is symbolized the course of a signal coming from the unit 46; the intensity $i_o$ corresponds to the state of rest of the pick-up. When a pressure is applied straight above or below an electrode, the intensity of the signal corresponding to this electrode increases to a value $i_p$ connected to the value of this pressure. In the case of a variation of the applied pressure due, for example, to a movement of weak amplitude of the tension element, the signal undergoes intensity variations or "noise" B connected to these pressure variations. On FIG. 10b, one has symbolized the course of the signal coming from the adaptation duct; the time constant of this circuit is chosen so as to integrate the signal on an adapted period in order to eliminate noises.

Figure 10C:
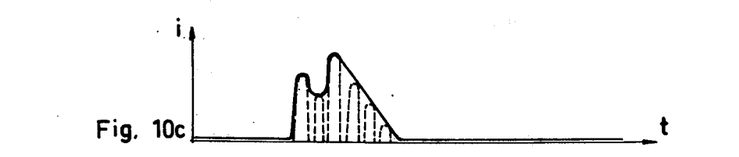

The dynamic method contains an amplification and detection circuit 48, arranged to amplify and detect the noise of each signal and furnish a dynamic signal as shown in FIG. 10c, of a value proportional to the amplitude of the noise; a temporization circuit 49 is provided in the example, in order to prolong each dynamic signal and to confer it a minimum determined duration $t$.

Figure 10D:
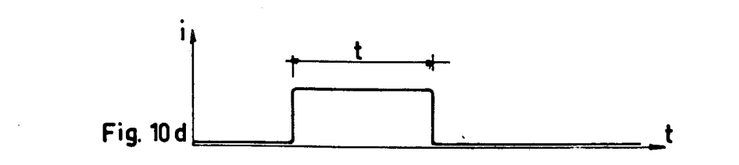

FIG. 10d shows a diagram of a signal coming from this circuit 49.

In the example, the signals coming from circuits 47 and 49 are injected into a summation circuit 50, adapted in order to furnish, according to the intended application, a command signal of the operator M starting from the static and dynamic signals.

The static component of the command signal makes it possible, at any moment, to regulate the tension effort as a function of the pressure detected by the pick-up, whereas the dynamic component makes it possible to control this tension effort in order to cause a "reflex reaction" in the case of an occurrence of accidental perturbations in the pressure distribution on the pick-up.

In particular, we have seen that a sliding tendency, in the phase that precedes the movement, is expressed by the appearance of dynamic signals; the control of the motor M can therefore be carried out so as to increase the tension pressure when a sliding tendency occurs. The hold is thus made stronger until the object is properly supported or fastened; the incrementation value of the tension pressure can be constant and programmed in advance or it can be variable and a function of the amplitude of the dynamic component of the command signal.

We claim:

1. A tactile pick-up for contacting an object and emitting electric signals associated with the deformation caused by the object, said pick-up comprising:
   a thin supple layer having a variable electrical conductivity as a function of its state of compression, a matrix of electrodes comprising a large number of conductive measuring electrodes distributed on a side of said supple layer, electricity supply means for producing in said supple layer a distribution of weak power currents which are repeated in a substantially identical manner straight above or below each said measuring electrode when said supple layer is at rest, said supply means comprising an electrical source having a reference potential and conducting elements distributed on the same side of said supple layer as said measuring electrodes so as to imbricate with these without electrical contact, said conducting elements comprising protective rings around said measuring electrodes and being connected to one terminal of said source thereby fixing them at a uniform potential, a plurality of output lead means, each connected to a said measuring electrode for emitting an electric signal representative of the electrical state of its said measuring electrode, and processing means connected to said output lead means for transforming the emitted signals into a unit of values that can be used or scanned.

2. A tactile pick-up according to claim 1 wherein said conducting elements are at an excitation potential determined with respect to said reference potential of said electrical source thereby serving as a power supply to said supple layer.

3. A tactile pick-up according to claim 1 and wherein said supply means includes a supple surface electrode on the other side of said supple layer connected to said electrical source, said supple surface electrode is at an excitation potential determined with respect to said reference potential, and said conducting elements are at said reference potential.

4. A tactile pick-up according to claim 1 in which each said output lead means consists of a concentric cable consisting on one hand, of a central conducting core connected to its corresponding said measuring electrode, and on the other hand, a conducting case insulated from said central core and fixed at said reference potential.

5. A tactile pick-up adapted to come into contact with an object and emit electrical signals representative of the imprint or impression of the object on said pick-up, said pick-up comprising:

a thin supple layer with a variable electrical conductivity as a function of its state of depression, a matrix of electrodes comprising a large number of conductive measuring electrodes distributed over one side of said supple layer, electricity supply means for producing in said supple layer a distribution of weak power currents which are repeated in a practically identical manner straight above or below each said measuring electrode when said supple layer is at rest, said supply means comprising an electrical source and conducting elements distributed over the same side of said supple layer as said measuring electrodes so as to imbricate with these without electrical contact, a plurality of output lead means, each connected to said measuring electrode for emitting an electrical signal representative of the electrical state of its said measuring electrode, and processing means, connected to said output lead means and containing an adaptation circuit having a determined time constant, for integrating the signals from said output lead means and furnishing analog static signals having a value proportional to the mean value of the pressure applied to said supple layer during said determined time periods.

6. A tactile pick-up adapted to come into contact with an object and emit electrical signals representative of the dynamic characteristics of the contact between it and the object, said pick-up comprising:

a thin supple layer with a variable electrical conductivity as a function of its state of depression, a matrix of electrodes comprising a large number of conductive measuring electrodes distributed over one side of said supple layer, electricity supply means for producing in said supple layer a distribution of weak power currents which are repeated in a practically identical manner straight above or below each said measuring electrode when said supple layer is at rest, said supply means comprising an electrical source and conducting elements distributed over the same side of said supple layer as said measuring electrodes so as to imbricate with these without electrical contact, a plurality of output lead means, each connected to said measuring electrode for emitting an electrical signal representative of the electrical state of its said measuring electrode, and processing means connected to said output lead means and containing a detection and amplification circuit for detecting variations of signals coming from said output lead means and furnishing dynamic signals of a value proportional to the amplitude of pressure variations in said supple layer.

7. A tactile pick-up for contacting an object and sequentially releasing electrical signals associated with the deformation caused by the object, said pick-up comprising:

a thin supple layer with a variable electrical conductivity as a function of its state of depression, a matrix of electrodes comprising a large number of conductive measuring electrodes distributed over one side of said supple layer, electricity supply means for producing in said supple layer a distribution of weak power currents which are repeated in a practically identical manner straight above or below each said measuring electrode when said supple layer is at rest, said supply means comprising an electrical source and conducting elements distributed over the same side of said supple layer as said measuring electrodes so as to imbricate with these without electrical contact, a plurality of output lead means, each connected to said measuring electrode for emitting an electrical signal representative of the electrical state of its said measuring electrode, and a processing means connected to said output lead means and containing an electronic switch, said switch having an input connected to said output lead means, and an output, said electronic switch comprising means for scanning successively and sequentially said output lead means in an order that is a function of addresses assigned to them.

8. A tactile pick-up according to claim 7 in which said processing means comprises:

a signal amplifier connected to the outlet of said electronic switch and having an output signal, electronic comparator means connected to the outlet of said amplifier for comparing said amplifier output signal to a memorized threshold and for releasing a command signal to a cathodic tube containing a visualization screen, a Wehnelt and deflection plates, said command signal being applied to the Wehnelt of said cathodic tube for modulating the beam emitted thereby, generator means connected to the deflection plates of said tube for generating two scanning step signals and delivering a step signal to each deflection plate to define a network by points on said visualization screen, said network containing a number of points equal to the number of said measuring electrodes of said pick-up, synchronization means connected to said generator and cooperatively associated with said switch for synchronizing said scanning means by scanning said signals emitted by said measuring electrodes.

9. A pick-up according to claim 7 in which said processing means at the output of said switch contains a signal amplifier, and at the output of said amplifier, analog-digital converter means for releasing a number of digital signals to effect numerical scanning.

10. A tactile pick-up adapted to come into contact with an object and emit electrical signals representative of the dynamic characteristics of the contact between it and the object, said pick-up comprising:

a thin supple layer with a variable electrical conductivity as a function of its state of depression, a matrix of electrodes comprising a large number of conductive measuring electrodes distributed over one side of said supple layer, electrically supply means for producing in said supple layer a distribution of weak power currents which are repeated in a practically identical manner straight above or below each said measuring electrode when said supple layer is at rest, said supply means comprising an electrical source and conducting elements distributed over the same side of said supple layer as said measuring electrodes so as to imbricate with these without electrical contact, a plurality of output lead means, each connected to a said measuring electrode for emitting an electrical signal representative of the electrical state of its said measuring electrode, and processing means connected to said output lead means and comprising a detection and amplification circuit for detecting variations of signals coming from said output lead means, furnishing dynamic signals of a value proportional to the amplitude of pressure variations in said supple layer and temporization circuit means for prolonging the dynamic signals and conferring them a determined minimum duration.

* * * * *